(12) United States Patent
Hosaka et al.

(10) Patent No.: US 7,096,156 B2
(45) Date of Patent: Aug. 22, 2006

(54) OPERATION SUPPORT SYSTEM FOR POWER PLANT

(75) Inventors: Shunji Hosaka, Yokohama (JP); Shigeru Matsumoto, Yokohama (JP); Toshihiro Yamada, Hino (JP); Akinori Kamito, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 74 days.

(21) Appl. No.: 10/745,478

(22) Filed: Dec. 29, 2003

(65) Prior Publication Data
US 2004/0204908 A1 Oct. 14, 2004

(30) Foreign Application Priority Data
Dec. 27, 2002 (JP) ............................. 2002-381331

(51) Int. Cl.
*G06F 11/30* (2006.01)
(52) U.S. Cl. .................................... 702/182
(58) Field of Classification Search ........ 702/182–184, 702/108; 700/108–110, 21, 22
See application file for complete search history.

(56) References Cited

U.S. PATENT DOCUMENTS

| | | | |
|---|---|---|---|
| 5,331,579 A * | 7/1994 | Maguire et al. | 703/2 |
| 6,490,506 B1 * | 12/2002 | March | 700/286 |
| 6,529,849 B1 | 3/2003 | Umezawa et al. | |
| 2001/0034582 A1 * | 10/2001 | Umezawa et al. | 702/136 |
| 2001/0053940 A1 * | 12/2001 | Horn et al. | 700/32 |
| 2003/0004659 A1 * | 1/2003 | Hayashi et al. | 702/60 |
| 2003/0074244 A1 * | 4/2003 | Braxton | 705/7 |
| 2003/0083827 A1 * | 5/2003 | Chow et al. | 702/34 |
| 2004/0102924 A1 * | 5/2004 | Jarrell et al. | 702/181 |

FOREIGN PATENT DOCUMENTS

JP 2002-259505 9/2002

OTHER PUBLICATIONS

Chuo, Q.B. et al., "Application of APACS in a Power Plant", Conference proceedings Vo. 2, pp. 1589-1598, The 11th Pacific Basin nuclear Conference, 1998.

* cited by examiner

*Primary Examiner*—Michael Nghiem
*Assistant Examiner*—Demetrius Pretlow
(74) *Attorney, Agent, or Firm*—Oblon, Spivak, McClelland, Maier & Neustadt, P.C.

(57) ABSTRACT

An operation support system for a power plant includes an input unit for inputting measured data of the power plant over a communication network, a data evaluating unit for quantitatively evaluating performance deterioration of the power plant and component equipment thereof and creating operation support data base on the input measured data, and an output unit for outputting the operation support data to a computer for confirming operation support data connected thereto over the communication network.

12 Claims, 6 Drawing Sheets

OPERATION SUPPORT SYSTEM FOR POWER PLANT

BACKGROUND OF THE INVENTION

1. Field of the Invention

The present invention relates to an operation support system for a plant for monitoring and evaluating plant performance and equipment status of various types of power plants, and more particularly, relates to an operation support system for a power plant for monitoring and evaluating plant performance and equipment status using measured data of a thermal power plant.

2. Related Art

As principal running costs for various types of power plants such as a thermal power plant, fuel costs, personnel costs, instrumental maintenance costs, and so forth will be conceived. Suppressing running costs can allow a power plant to be run efficiently.

As costs required for equipment maintenance of a power plant, there are remodeling costs to improve performance of plant component equipment beyond the original performance thereof, reworking costs to recover the performance level of plant component equipment up to the original level thereof, management costs of spare parts, and so forth.

In general, power plant component equipment deteriorates in performance thereof as time passes, as a result, plant thermal efficiency drops, thereby increasing fuel costs. In order to cut back on fuel costs, running at an economical load range in which the optimal plant thermal efficiency can be obtained is preferable, however, running conditions change due to degradation of plant component equipment and the daily running load, so the load range suitable for plant thermal efficiency also changes. Accordingly, with regard to a power plant, it is hard to select and use the appropriate load range in which the optimal plant thermal efficiency can be obtained.

Further, with a power plant, in order to prevent fuel costs from increasing, maintenance of plant component equipment is performed as a measure so as to maintain or improve equipment performance. In order to implement such measures, it is necessary to precisely diagnose and comprehend how far the plant component equipment has deteriorated. In the event of attempting to prevent fuel costs from increasing by maintaining and improving equipment performance with plant component equipment being reworked and remodeled, it is preferable to precisely evaluate, beforehand, cost effects for equipment rework and the like.

However, a power plant is configured of a great number of pieces of plant component equipment, and accordingly, it is difficult to determine cost-to-effect for reworking equipment and the like only with process data that is measured. Moreover, with a power plant, spare parts need to be kept in stock to prepare for accidental equipment damage, so that a damaged portion of equipment can be immediately repaired or reworked so as to resume power generation, which requires management costs for the stock management.

Although running costs for a power plant can be reduced by running the plant more efficiently, there is a close relationship between running costs and equipment maintenance costs, and accordingly, equipment maintenance costs are preferably taken into account so as to make running of a plant more efficient, as well as fuel costs and personnel costs.

On the other hand, in order to keep track of equipment performance of plant component equipment so as to evaluate the running costs, there is the need to have the know-how of the manufacturing equipment manufacturer. Dispatching an equipment manufacturer engineer to a local power plant each time plant component equipment is evaluated not only leads to time and labor problems, but also may let the most appropriate evaluation timing slip by due to restrictions on how often evaluation can be performed.

As conventional technology, the following publications or documents may be listed up.

(1) Japanese Patent Laid-open (KOKAI) Publication No. HEI 4-242123. This discloses a plant performance monitoring device and teaches technique for improving the monitoring precision of power plant record by selecting highly reliable plant performance data. The device monitors performance of respective plant component equipment using plant measurement data.

(2) Japanese Patent Publication No. SHO 62-4526. This discloses a performance monitoring technique of a power plant, i.e., technique for evaluating how plant thermal efficiency is affected, by monitoring plant performance calculation and aged deterioration thereof from process data such as pressure, flow rate, electric power and the like. This evaluates plant thermal efficiency affected by performance degradation of plant component equipment.

(3) Japanese Patent Laid-open (KOKAI) Publication No. HEI 11-229820. This discloses technique for analyzing how change in performance of respective plant component equipment affects the entire power plant, and recovering thermal efficiency by appropriate maintenance and reworking, by improvement of power plant thermal efficiency diagnostic precision.

(4) Japanese Patent Laid-open (KOKAI) Publication No. 2001-263006. This discloses technique for appropriately recovering thermal efficiency by analyzing performance change of respective plant component equipment affecting the entire power plant, and by maintenance and rework.

(5) Japanese Patent Laid-open (KOKAI) Publication No. 2002-122005. This discloses technique for improving plant thermal efficiency diagnostic precision by diagnosing factors for power plant thermal inefficiency using evaluation of a heat balance analysis method and teaches technology to improve precision of performance evaluation of plant component equipment.

However, the diagnostic/monitoring technique for power plants disclosed in the above-described patent documents only diagnoses and evaluates the performance degradation of a power plant and component equipment thereof. That is to say, a technology or means for effectively and integrally evaluating how to rework or remodel plant component equipment is not introduced. Moreover, a technique to quantitatively evaluate how much loss occurs due to performance degradation of plant component equipment, and whether or not there is reworking of plant component equipment, is not introduced either.

(6) Japanese Patent Laid-open (KOKAI) Publication No. 2002-259505. This discloses a data presenting system regarding power equipment, i.e., a data presenting system regarding power equipment capable of inexpensively acquiring evaluation data such as power efficiency, power costs, and so on, over a communication network. This system connects a power plant side with a service center side over a communication network, and the service center side creates and presents evaluation data of power efficiency and power costs (fuel costs per unit generated, over the entire life span of equipment) based on acquired measured data through this network, and bills the plant for reference of the evaluation data.

According to this data presenting system, a data processing process is installed at a place isolated from the power plant side, and receiving measured data and sending evaluation data are performed over a communication network, so that the power plant side can avoid extra investment regarding the data processing process.

With the data presenting system regarding power equipment according to this Patent Document (6), a technique capable of evaluating deterioration of power efficiency and equipment performance over time in the view of fuel costs is disclosed, which compares the current measured process values (the state wherein equipment has deteriorated) with predicted process values of designed performance presuming that the same running conditions as the present will continue (the initially intended state).

With the data presenting system regarding power equipment according to Patent Document (6), transition of process values resulting from of deteriorated equipment performance of plant component equipment is confirmed, and accordingly, it is difficult to quantitatively confirm how many percent the performance of the plant component equipment has deteriorated.

Moreover, plant component equipment of a power plant is reworked in accordance with deterioration due to aging, but not all of the plant component equipment is reworked. With conventional data presenting systems, estimation is computationally performed using as standard for comparison a state wherein all of the plant component equipment has been completely reworked.

However, with a state in which multiple pieces of plant component equipment have deteriorated, in the event of only specific component equipment having being reworked, it is difficult to confirm how far the power efficiency of the power plant or fuel costs has been improved. It is also impossible to perform evaluation in the event of equipment performance having being been improved beyond the designed performance thereof by remodeling the plant component equipment. Furthermore, a technique for quantitatively evaluating whether or not plant component equipment should be reworked is not mentioned at all in the Patent Document (6).

SUMMARY OF THE INVENTION

The present invention has been conceived to solve or eliminate defects or drawbacks encountered in the prior art mentioned above and an object of the present invention is therefore to provide an operation support system for a power plant wherein the state of performance deterioration of power plant component equipment is accurately evaluated with high precision, and operation support for a power plant is accurately and effectively carried out.

Another object of the present invention is to provide an operation support system for a power plant wherein, in the event that the performance of respective plant component equipments is deteriorated, influence of the deteriorated equipment performance and effects of improvement of the deterioration are quantitatively evaluated to perform the plant operation support in a more accurate and improved manner.

The above and other objects can be achieved according to the present invention by providing, in one aspect, an operation support system for a power plant comprising: input means for inputting measured data over a communication network; data evaluating means for quantitatively evaluating performance degradation of component equipment thereof based on measured data input by the input means so as to create operation support data; and output means for outputting the operation support data to a computer for confirming the operation support data connected thereto over a communication network.

In a preferred embodiment of the above aspect, the evaluating means may include a heat balance model for calculating values in performance of respective plant component equipment with heat balance computation based on measured data of the power plant, a performance values storing means for storing values in performance of the respective plant component equipment, and time-lapse transition evaluating means for evaluating deteriorated states of the plant component equipment based on transition of values in performance of the plant component equipment over time.

The data evaluating means may include a future prediction evaluating means for inputting stored values in performance of the plant component equipment, with the future prediction evaluating means predicting future values in performance of the plant component equipment based on statistical work referring to the stored values in performance.

The data evaluating means may include a failure maintenance cost evaluating means for picking out heavily deteriorated components from the plant component equipment, with the failure maintenance cost evaluating means obtaining maintenance costs which occur in the event of the deteriorated component equipment failing. The data evaluating means may further include thermal inefficiency loss evaluating means for obtaining losses due to thermal inefficiency, with the loss evaluating means obtaining maintenance costs at the time of thermal inefficiency in the deteriorated state of values in performance of the plant component equipment.

On the other hand, in order to solve the afore-mentioned defects or drawbacks, the present invention provides, in another aspect, an operation support system for a power plant comprising data evaluating means for inputting measured data of the power plant, wherein the data evaluating means includes a heat balance model for calculating values in performance of respective plant component equipment with heat balance computation based on measured data of the power plant, and a simulation model for inputting values in performance of the respective component equipment, with the simulation model obtaining process values using values in performance of the plant component equipment so as to estimate heat balance at the time of changing running conditions.

In this aspect, the simulation model may estimate heat balance in the event of changing values in performance of the plant component equipment, the equipment configuration thereof, or the piping system configuration thereof.

Furthermore, the data evaluating means may include a simulation model for estimating plant thermal efficiency as to calculated parameters representing equipment performance of the plant component equipment, a fluidic state, or power load, and further, the data evaluating means may be connected to a data collection device of the power plant over a communication network. The data evaluating means may be connected to a computer for confirming operation support data over a communication network.

Furthermore, in both the above aspects, the data evaluating means may include predicted power cost evaluating means for calculating power costs based on estimated heat balance in the event of changing values in performance of the plant component equipment, the equipment configuration thereof, or the piping system configuration thereof, and power cost comparing means for comparing predicted power costs calculated by the predicted power cost evaluating means with current power costs of the power plant.

The data evaluating means may include predicted power cost evaluating means for calculating amount-of-change of power costs based on estimated heat balance in the event of changing values in performance of the plant component equipment, the equipment configuration thereof, or the piping system configuration thereof, and profit-and-loss evaluating means for calculating profit-and-loss according to the change based on amount-of-change of power costs and repair costs required for the change.

The data evaluating means may further include performance values storing means for storing values in performance of the plant component equipment, future prediction evaluating means for predicting future values in performance of respective components based on statistical work using past stored values in performance by the storing means, and a simulation model for calculating future heat balance using predicted values in performance of the respective component equipment.

According to the operation support system for a power plant of the present invention of the structures and characters mentioned above, the performance deterioration state of component equipment can be accurately evaluated by understanding the transition of values in performance of respective component equipment over time, based on measured data of the power plant by using heat balance calculation, and further, effective and economical operation support can be performed by acquiring measured data through a communication network and presenting operation support data.

In addition, more precise operation support can be performed by evaluating future prediction of performance deterioration, losses due to a failure of deteriorated equipment by using time-series data of values in performance of plant component equipment. Furthermore, simulation reflected by values in performance of plant component equipment can be performed, and as a result, a state of a power plant under changed running conditions with the current performance, and the effects in the event of reworking and remodeling the deteriorated equipment can be accurately and quantitatively evaluated. The data serving as a guidance for running can be presented, thereby enabling more precise operation support to be realized, thus being effective and advantageous.

The nature and further characteristic features will be made more clear from the following descriptions made with reference to the accompanying drawings.

DESCRIPTION OF THE PREFERRED EMBODIMENTS

A preferred embodiment of the present invention will be described hereunder with reference to the accompanying drawings.

Figure 1:
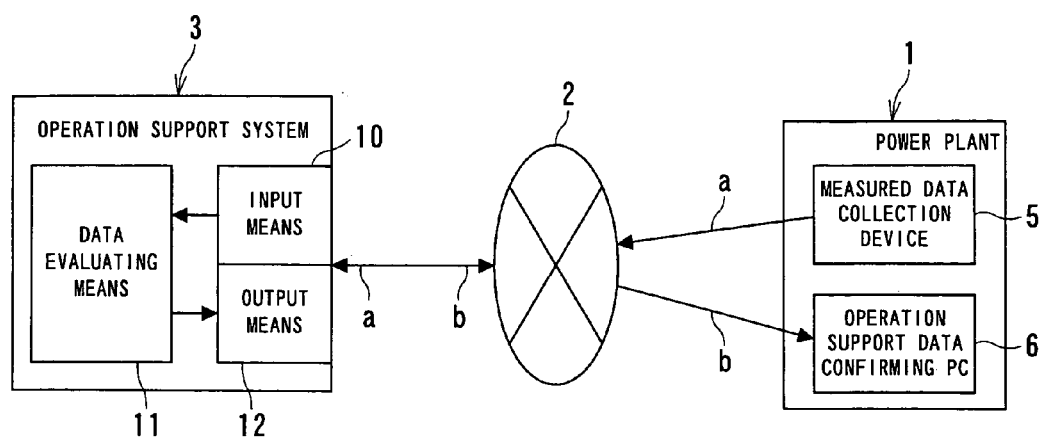
FIG. 1 is a schematic diagram illustrating a system configuration example in the event of employing an operation support system for a power plant according to the present invention.

With reference to FIG. 1, illustrating, as an example, an operation support system for a thermal power plant to which the present invention is applied. Further, power plants to which the present invention is applied also include combined cycle power plants, steam power plants, co-generation power plants, and the like, as well as thermal power plants.

In FIG. 1, reference numeral 1 denotes a power plant such as a thermal power plant or the like, and this power plant 1 is connected with an operation support system 3 over a communication network 2, for example, Internet and the like. The operation support system 3 acquires process measurement data "a" from the power plant 1 over the communication network 2 and evaluates the acquired process measurement data "a", and then presents the evaluated operation support data "b" to the power plant 1 side through the communication network 2.

The power plant 1 is connected with a data collection device 5 for collecting and transmitting process measurement data "a" of a plant component equipment, not shown, but such as turbines and generators, and an operation support data confirmation personal computer (PC) 6 serving as a confirmation computer for confirming the operation support data "b" transmitted from the operation support system 3 on Web. The measured data collection device 5 and the operation support data confirmation PC 6 are connected to the operation support system 3 so as to transmit/receive required information data over the communication network 2. The operation support data confirmation PC 6 may be installed outside of the power plant 1.

Security apparatuses such as a firewall may be provided between the power plant 1 and the communication network 2 and between the operation support system 3 and the communication network 2, in consideration of security concerns. Moreover, a dedicated line may be employed as a communication pathway instead of a communication network such as Internet, and furthermore, wireless communication may be employed.

Moreover, the number of the operation support data confirmation PCs 6 is not restricted to one, and two or more PCs may be installed. The operation support data "b" is not restricted to being presented over an Web server, and e-mail or dedicated communication software or the like may be employed. In the event of the operation support data "b" being represented over a Web server, security measures such as setting passwords and the like will be preferably implemented.

Figure 2:
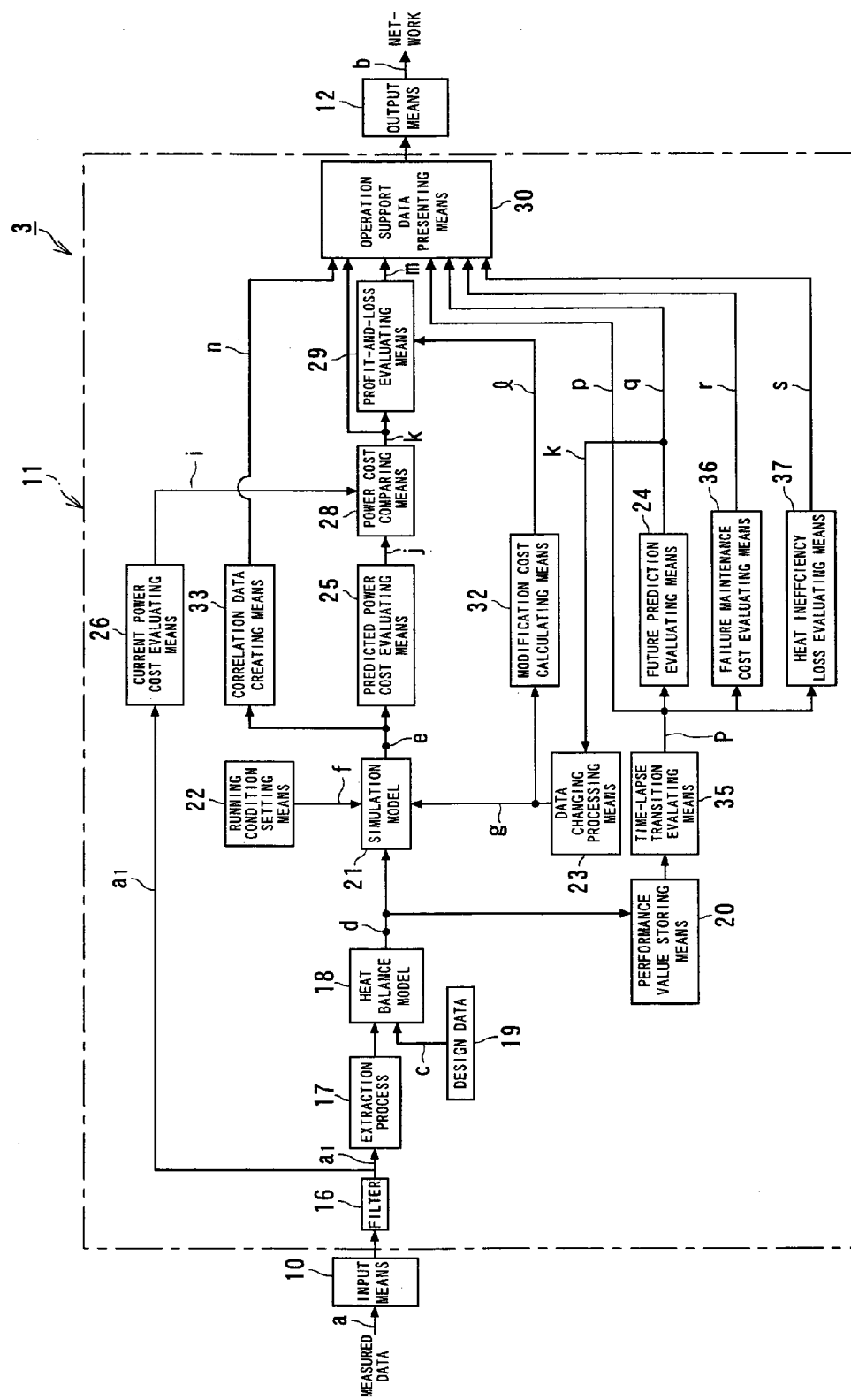
FIG. 2 is an internal configuration diagram of a data processing flow equipped with the operation support system for a power plant according to the present invention.

FIG. 2 exemplifies a data processing flow of the plant measurement data "a" within the operation support system 3 for a power plant.

The process measurement data "a" of the plant component equipment is acquired from the power plant side to the input means 10 of the operation support system 3 through the communication network 2. The process measurement data "a" acquired through the input means 10 is subjected to data processing at the data evaluating means 11 for evaluating performance deterioration of the power plant 1 and the component equipment thereof so as to create operation support data "b". The created operation support data "b" is transmitted from the output means 12 to the power plant side through the communication network 2. The process measurement data "a" acquired from the input means 10 to the data evaluating means 11, as shown in FIG. 2, is sorted out based on noise removal or running conditions by a filter 16. Time-averaging for several minutes to several hours may be employed as for a method of removing noise, for example.

Of the process measurement data which is sorted out by the filter 16 so as to remove noise, the process measurement data required for calculating values in performance of the plant component equipment such as a boiler, turbine, generator, and the like, is extracted by extraction processing means 17. This extracted data is input to a heat balance model 18. Design data "c" set to the power plant 1 beforehand is also input to this heat balance model 18. The design data "c" is stored in design data storing means 19.

The reason why the design data "c" is input to the heat balance model 18 is to handle some abnormal cases wherein the measured data required for calculating values in performance depending on plant component equipment employed cannot be obtained or cannot be measured. In this case, design data of peripheral equipment such as process piping is employed so as to obtain the required process design data, and measured data is inferred within the heat balance model 18.

Heat balance calculation of the plant component equipment of the power plant 1 is performed based on the extracted data and the inferred data. This heat balance calculation will be performed in the same way as with a known thermal efficiency diagnostic method of a power plant, for example, disclosed in the Japanese Patent Laid-open (KOKAI) Publication No. HEI 04-242123 or HEI 11-229820. According to this balance calculation, values in performance "d" regarding the respective plant component equipment are obtained.

While the values in performance "d" of the plant component equipment calculated at the heat balance model 18 are input and stored to a performance value storing means 20, these values are input to a simulation model 21 as well. As for performance values "d" of the plant component equipment, items such as turbine efficiency, pump efficiency, feed-water heater thermal transmittance, and the like, are employed.

In the simulation model 21, process values "e" are calculated using the values in performance "d" of the plant component equipment. That is to say, this calculation is a counter-calculation against the heat balance that in the heat balance model 18 so as to obtain predicted process values "e" from the values in performance of the plant component equipment. Thus, the simulation model 21 can estimate heat balance in the event of running conditions being changed, e.g., in the event that the current plant performance is kept and computational conditions are changed.

On the other hand, the simulation model 21 is connected with a running condition setting means 22, and running conditions setting information "f" such as running duty of the power plant 1, temperature of seawater, and the like, is input from the running condition setting means 22 to the simulation model 21.

Furthermore, the simulation model 21 is also connected with data changeover processing means 23. In the event that the value in performance "d" of the specific plant component equipment or the configuration of equipment/piping needs to be changed, change information "g" is input from the data change processing means 23 to the simulation model 21. The data change processing means 23 is connected with future prediction evaluating means 24 so that the change information "g" can include predicted values in performance "h" in the future.

The predicted process values "e" calculated in the simulation model 21 are input to a predicted power cost evaluating means 25, and fuel costs per unit electric energy (hereafter, referred to as "power costs") are calculated. A specific example will be described later with regard to power costs evaluating processing in the predicted power cost evaluating means 25.

On the other hand, process measurement data "a1" subjected to filter processing at the filter 16 is input to current power cost evaluating means 26, and there the same calculation as with that of the predicted power cost evaluating means 25 is then performed so as to obtain the current power costs.

While the obtained current power costs information "i" is input to a power cost comparing means 28, predicted power costs information "j" is input from the predicted power cost evaluating means 25 to the power cost comparing means 28 as well. Subsequently, the difference between the current power costs and the predicted power costs is calculated at the power cost comparing means 28, and the obtained power cost difference information "k" is input to a profit-and-loss evaluating means 29 and also to a operation support data presenting means 30.

Moreover, an output signal "l" is input from a modification cost calculating means 32 to the profit-and-loss evaluating means 29. The modification cost calculating means 32 calculates costs required for modifying values in performance of the plant component equipment or the configuration of equipment/piping using an actual power plant based on the change information "g" output from the data change processing means 23. The profit-and-loss evaluating means 29 calculates profit-and-loss due to modification using modification costs and power costs difference in accordance with modification calculated at the modification cost calculating means 32. This profit-and-loss information "m" is transmitted to the operation support data presenting means 30.

Furthermore, the predicted process values "e" which are simulation results at the aforementioned simulation model 21 are also input to the correlation data creating means 33. The correlation data creating means 33 perform processing for estimating correlation between plant thermal efficiency of a power plant and specific calculation parameters, for example. Examples of calculation parameters include parameters representing power load, seawater temperature, equipment performance of plant component equipment, and fluidic state.

Figure 10:
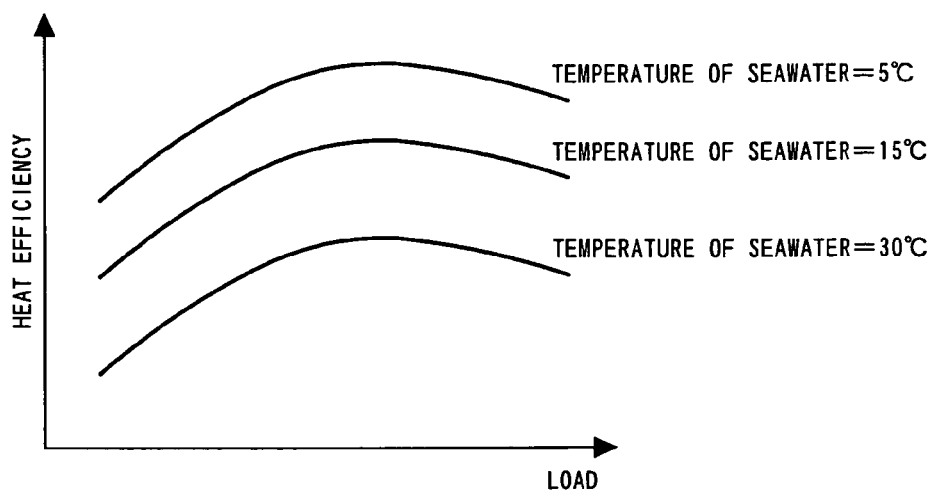
FIG. 10 is a diagram exemplifying correlation among thermal efficiency, plant loading, and temperature of seawater.

Appropriately understanding correlation among thermal efficiency changing in accordance with deterioration of the plant component equipment worsening, power load, and seawater temperature (see FIG. 10) provides information about the most effective power load in the event of the change in the running conditions such as a change in seawater temperature and also provides a guidance for running. Correlation data "n" created at the correlation data creating means 33 is input to the operation support data presenting means 30.

Now, the values in performance "d" of the plant component equipment calculated using heat balance calculation by the heat balance model 18 are input to the performance values storing means 20. The values in performance calculated at the performance values storing means 20 are sequentially accumulated according to plant component equipment and then stored.

The performance values storing means 20 is electrically connected to time-lapse transition evaluating means 35. The time-lapse transition evaluating means 35 reads out the stored and accumulated values in performance, and evaluates transition of values in performance for the respective plant component equipment over time. Evaluating transition over time of values in performance for respective equipment can also evaluate the current state of equipment performance and deterioration tendency of equipment performance up to now.

Evaluating the deteriorated state of the plant component equipment with transition over time of accumulated values in performance allows evaluation of values in performance of the respective plant component equipment without an equipment manufacturer engineer being dispatched to the installation site, thereby enabling accurate and effective running of the power plant 1.

Time-lapse transition evaluation information "p" obtained with the internal processing by the time-lapse transition evaluating means 35 is input to the operation support data presenting means 30, future prediction evaluating means 24, operational cost evaluating means 36 for evaluating costs at the time of failure of deteriorated equipment, and cost evaluating means 37 for evaluating costs due to deterioration in thermal efficiency, respectively. The evaluated results "q", "r", and "s", processed at each of the evaluating means 24, 36, and 37, are input to the operation support data presenting means 30.

The operation support data presenting means 30 inputs various types of information regarding such as comparative results of power costs (power costs difference information "k") from the power cost comparing means 28, evaluation results for return-on-investment (profit-and-loss information "m") from the profit-and-loss evaluating means 29, evaluation results for equipment status of the plant component equipment up to now from the time-lapse transition evaluating means 35, future prediction results of equipment performance of the plant component equipment (time-lapse transition evaluation information "p") from the future prediction evaluating means 24, losses evaluation results in consideration of failure probabilities of deteriorated equipment of the plant component equipment (losses evaluation information r) from the deteriorated-equipment-operation cost evaluating means 36, losses evaluation results due to thermal inefficiency (losses evaluation information s) from the cost evaluating means 37, a guidance for running (correlation data "n") from the correlation data creating means 33, and the like, and evaluates this information so as to output the information to the communication network 2 as running support data "b".

Figure 3:
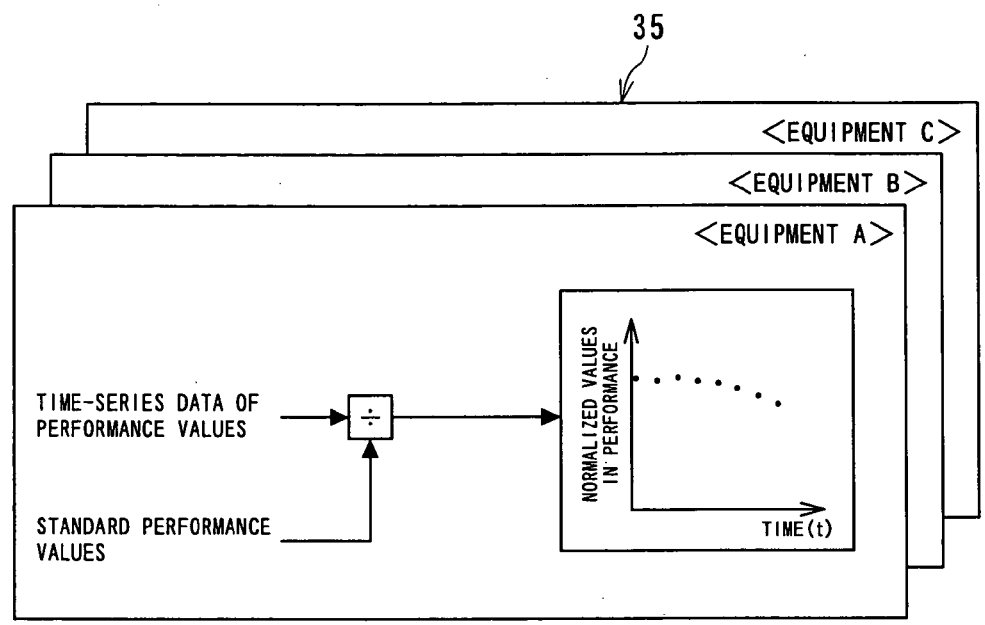
FIG. 3 is a diagram illustrating an internal processing example of time-lapse transition evaluating means equipped with the operation support system.

Incidentally, the time-lapse transition evaluating means 35 equipped with the operation support system 3 of the power plant 1 performs the internal processing shown in FIG. 3. The time-lapse transition evaluating means 35 evaluates the state of deterioration of the plant component equipment with transition of accumulated values in performance over time, which are calculated for the respective plant component equipment A, B, C and sequentially stored.

With the internal processing of the time-lapse transition evaluating means 35, the stored time-series data for values in performance of each of the respective equipments is normalized by dividing with standard values in performance data, and transition of normalized values in performance over time is charted. The standard values in performance data may be designed values in performance or values in performance at a specific day and time. The understanding of the degree of equipment deterioration can be facilitated by normalizing values in performance of the respective equipment.

Moreover, the time-series data for values in performance has irregularities due to the influence of difference in running conditions at the time of measuring data of the plant component equipment, and accordingly, statistical work for correcting these irregularities is preferably performed.

Figure 4:
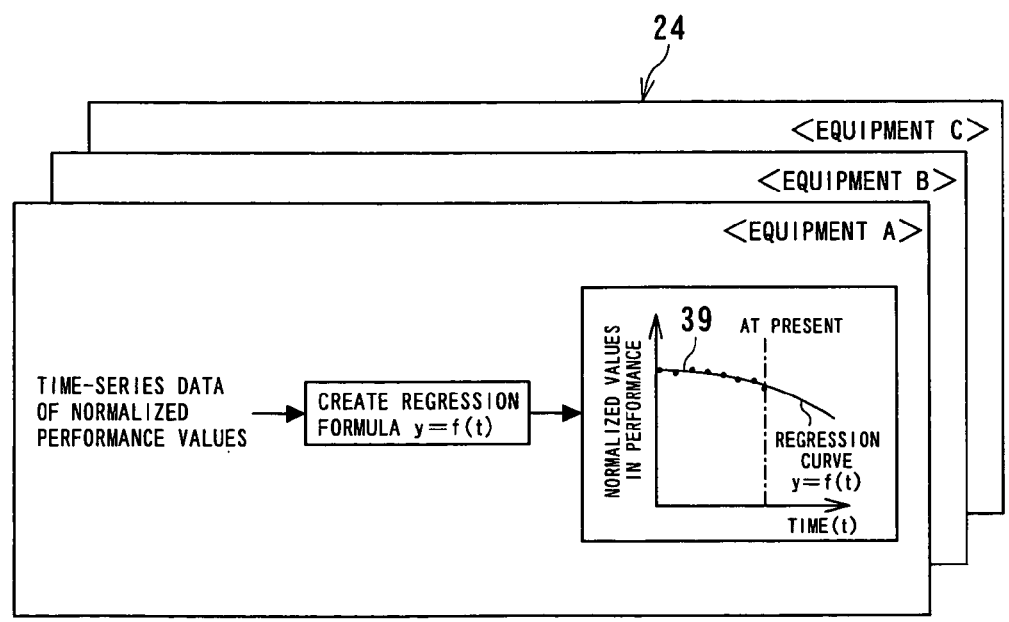
FIG. 4 is a diagram illustrating an internal processing example of future prediction evaluating means equipped with the operation support system.
Figure 5:
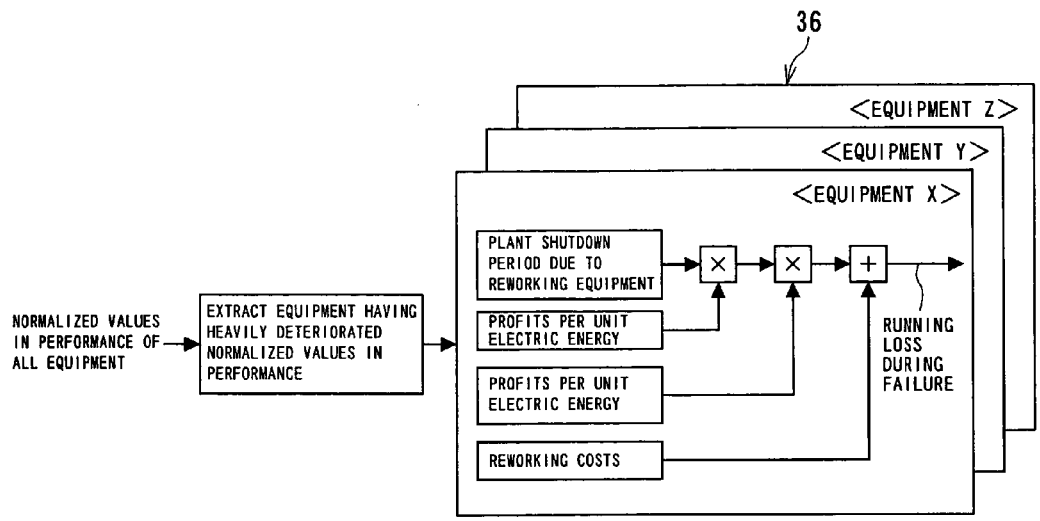
FIG. 5 is a diagram illustrating an internal processing example of failure maintenance cost evaluating means of deteriorated equipment equipped with the operation support system.
Figure 6:
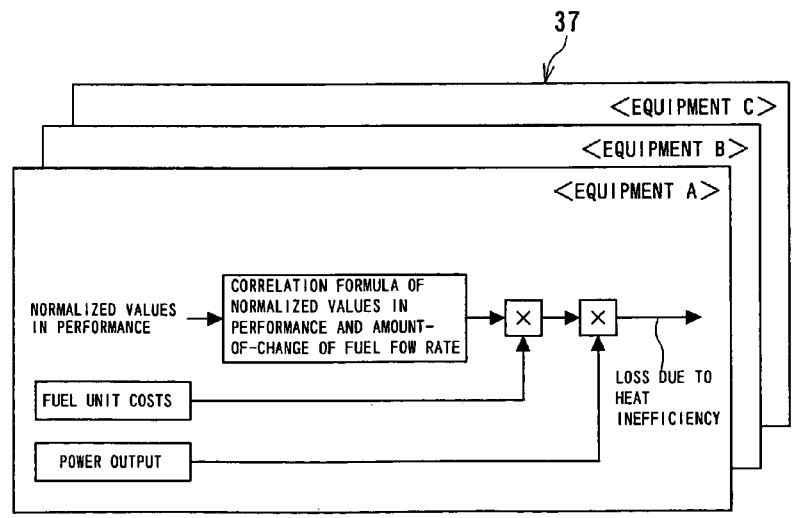
FIG. 6 is a diagram illustrating an internal processing example of thermal inefficiency loss evaluating means equipped with the operation support system.

The equipment performance evaluation results so far, processed at the time-lapse transition evaluating means 35, are input to the future prediction evaluating means 24, the deteriorated-equipment-operation cost evaluating means 36, and the thermal inefficiency loss evaluating means 37 respectively, where the internal processing shown in FIGS. 4 through 6 is performed.

With the future prediction evaluating means 24, the internal processing shown in FIG. 4 is performed for each of the respective plant component equipments, and the future values in performance of the plant component equipment are predicted by statistically processing the stored values in performance. The future prediction evaluating means 24 derives a regression formula from normalized time-lapse transition data through statistical work, and creates a regression curve 39. Inputting a period to be predicted to this regression curve 39 yields predicted values in performance of the respective plant component equipment in normalized values in performance fashion at that time.

The future prediction evaluating means 24 included in the operation support system 3 predicts future values in performance from the stored values in performance using statistical work, thereby evaluating a period at which to perform maintenance, so as to enable precise operation support for the power plant 1.

In the event that values in performance of the plant component equipment are restricted to a predetermined value or less, the period up to reach the remitted value can be readily predicted from the regression curve 39, thereby enabling a maintenance period to be selected and further enabling recommendation. At the time of maintenance and inspection, since a period at which the required parts are to be arranged to obtain can be also grasped, it becomes possible to reduce the stock of spare parts. Moreover, with the deteriorated-equipment-operation cost evaluating means 36, internal processing is performed as shown in FIG. 5.

With the plant component equipment of the power plant 1, normalized values in performance are obtained in paradigmatic fashion using the time-lapse transition evaluating means 35 as shown in FIG. 3. On the other hand, with the deteriorated-equipment-operation cost evaluating means 36 for deteriorated equipment, equipment having heavily deteriorated performance is picked out from the normalized values in performance, from all the performance monitoring target equipment.

Moreover, with the deteriorated-equipment-operation cost evaluating means 36, profits, which should have been obtained during a repair period had the equipment been running, are calculated in accordance with: profits per unit of electric energy of the power plant 1; the period in which the power plant 1 is down due to equipment repair; and power output during normal running. These implicit profits (profits and loss) are added to the repair costs, thereby enabling predicted losses at the time of equipment failure to be calculated.

Losses due to equipment failure can be reduced by preferentially maintaining equipment of which the predicted losses are expensive, at the time of maintenance and inspection. Accordingly, the maintenance priority of turbine component equipment can be quantitatively evaluated, thus making further accurate the operation support of the power plant 1.

Further, although FIG. 3 shows an example wherein the current values in performance of the equipment are input to the time-lapse transition evaluating means 35 so as to pick out deteriorated equipment, an arrangement may be made such that the future predicted values in performance are input to the time-lapse transition evaluating means 35 so as to pick out deteriorated equipment.

FIG. 6 is a diagram illustrating an internal processing example of the thermal inefficiency loss evaluating means 37. With the thermal inefficiency loss evaluating means 37, a correlation formula between the normalized values in performance of the plant component equipment and amount-of-change of flow rate of fuel per unit output as to performance deterioration is created beforehand, and this correlation formula is multiplied by fuel evaluation and power output, thus calculating losses due to thermal inefficiency due to performance inefficiency of the plant component equipment to be obtained.

The thermal inefficiency loss evaluating means 37 can quantitatively evaluate the maintenance priority of the equipment based on the deteriorated state of the plant component equipment, thus enabling operation support of the power plant 1 to be more accurate.

Instead of the correlation formula between the normalized values in performance and the amount-of-change of flow rate of fuel per unit output, an arrangement may be made so that a data map between the normalized values and the amount of change of flow rate is created so as to calculate thermal inefficiency losses due to equipment performance deterioration using this data map. The basic data of the correlation formula and the data map can be obtained using the simulation model 21 and the correlation data creating means 33.

Furthermore, an arrangement may be made such that in the amount-of-change of flow rate of fuel per unit output is directly calculated at the simulation model 21 using the standard values in performance and the current values in performance of the plant component equipment. While the thermal inefficiency loss evaluating means 37 shown in FIG. 6 inputs the current values in performance of the plant component equipment so as to evaluate the current losses, an arrangement may be made so that the thermal inefficiency loss evaluating means 37 inputs the future predicted values in performance so as to predict loss evaluation.

Figure 7:
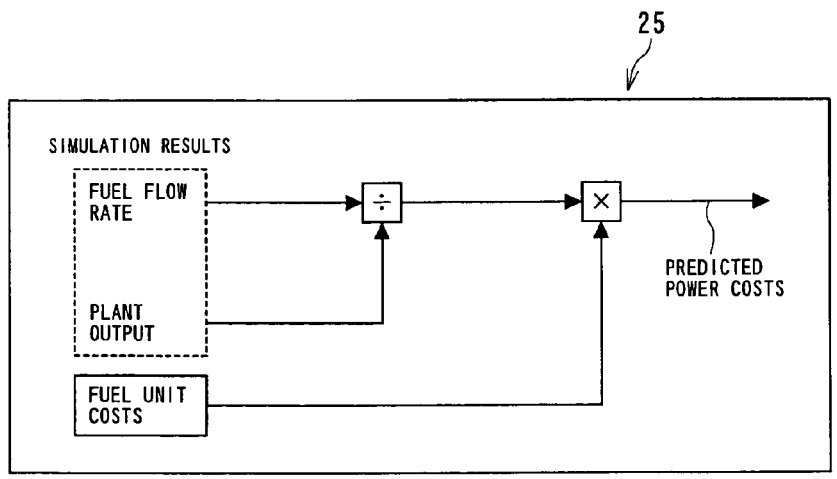
FIG. 7 is a diagram illustrating an internal processing example of predicted power cost evaluating means equipped with the operation support system.

On the other hand, the predicted process values "e" calculated at the simulation model 21 of the operation support system 3 are input to the predicted power cost evaluating means 25, where fuel costs per unit electric energy (power costs) are calculated. The internal processing shown in FIG. 7 is performed with the predicted power cost evaluating means 25. The predicted power cost evaluating means 25 divides the flow rate of fuel which is simulation results (predicted process values) calculated by the simulation model 21 by plant the output, and multiplies the obtained result by the unit price of fuel, whereby predicted power costs can be obtained.

Figure 8:
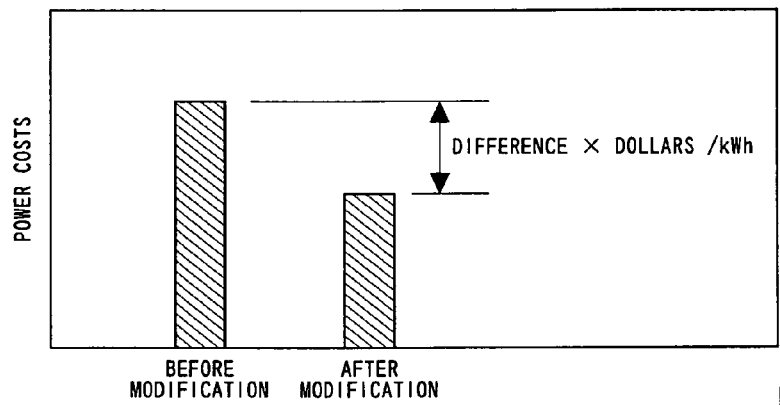
FIG. 8 is a diagram illustrating a comparative chart of current power costs and predicted power costs.

The current power costs can also be calculated by the current power cost evaluating means 26, using the same processing as with that in the predicted power cost evaluating means 25, and the difference between the current power costs and the predicted power costs is calculated using the power cost comparing means 28. Alternately, the current power costs and the predicted power costs may be compared, using the power costs comparative chart shown in FIG. 8.

Figure 9:
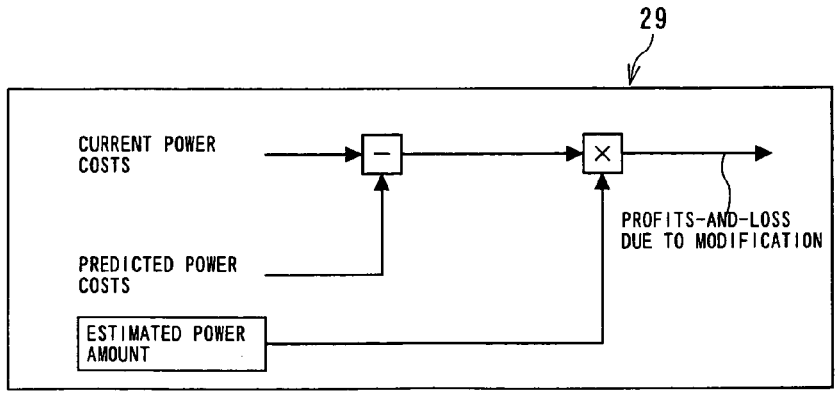
FIG. 9 is a diagram illustrating an internal processing example of profit-and-loss evaluating means equipped with the operation support system.

Furthermore, the current power costs and the predicted power costs are subjected to comparative processing at the power cost comparing means 28, and the comparison results are input to the profit-and-loss evaluating means 29. The profit-and-loss evaluating means 29 performs the internal processing shown in FIG. 9.

With the profit-and-loss evaluating means 29, profit-and-loss can be obtained in the event of changing the values in performance of the plant component equipment or the equipment/system configuration by multiplying the difference between the current power costs and the predicted power costs by the predicted power amount. Further, the predicted power amount can be generally obtained by multiplying the rated power of the plant by a predicted running period.

Further, the operation support system 3 of the power plant 1 includes the heat balance model 18, the values in performance of the plant component equipment are individually calculated using heat balance calculation based on the process measurement data of the power plant 1 at this heat balance model 18, and the calculated values in performance of the respective equipment are transmitted to the simulation model 21.

The simulation model 21 inversely calculates the process values of the power plant 1 using the values in performance of the respective equipment. That is to say, the simulation model 21 estimates the heat balance at the time of the running conditions being changed by performing inverse processing as to the heat balance model 18.

While the running load, the seawater temperature and the like are input from the running condition setting means 22 to the simulation model 21, the change information is input from the data modification processing means 23 to the simulation model 21 in the event that the values in performance of specific equipment, equipment configuration, or piping configuration is required to be changed. With the operation support system 3, heat balance at the time of the calculation conditions in the current performance of the power plant 1 being changed is estimated at the simulation model 21, and thus, prediction calculation at the time of seawater temperature changing can be performed based on the current performance of the power plant 1, and consequently, more precise operation support as to the power plant 1 can be performed.

Moreover, the operation support system 3 of the power plant 3 estimates the heat balance at the time of the values in performance of arbitrary plant component equipment being changed by using the simulation model 21 so as to accurately evaluate effects at the time of reworking or remodeling the plant equipment. Furthermore, the operation support system 3 estimates the heat balance at the time of arbitrarily changing the equipment configuration and piping configuration by using the simulation model 21 so as to accurately evaluate effects at the time of changing equipment configuration and piping configuration, and consequently, enabling more precise operation support.

Furthermore, the operation support system 3 of the power plant 1 calculates power costs at this time on the basis of the estimated heat balance in the event of the values in performance of arbitrary plant component equipment, or equipment configuration and piping configuration being changed, and compares the calculated results with the current power costs of the power plant. Thus, the improvement effects before and after a modification can be quantitatively evaluated, and more precise operation support can be realized.

On the other hand, the operation support system 3 of the power plant 1 calculates the power costs corresponding to the amount-of-change of costs due to modification at the predicted power cost evaluating means 25 based on the estimated heat balance in the event of the values in performance of arbitrary plant component equipment, or changing the equipment configuration and the piping configuration, and calculates the profit-and-loss due to the modification at the profit-and-loss evaluating means 29 by using the power costs corresponding to amount-of-change and repair costs required for the modification. Thus, the improvement effects before and after the modification can be evaluated from the aspect of investment and returns.

Furthermore, this operation support system stores the calculated values in performance of the plant component equipment, and statistically predicts the future values in performance of the respective equipment based on the past stored values in performance using the future prediction evaluating means 24, and then calculates the future heat balance based on the above-described predicted values in performance of arbitrary single or multiple pieces of equipment using the simulation model 21. Thus, the future influence of not reworking or remodeling the equipment with deteriorated performance can be evaluated beforehand, thereby enabling more precise operation support to be realized.

In addition, with the operation support system 3 of the power plant 1, the measured data of the power plant 1 can be acquired from a site through the communication network 2, and accordingly, an engineer from an equipment manufacturer need not directly go on the site, and further, upon operation support data "b" which is evaluation results based on the measured data being presented at the confirmation PC 6 through the communication network 2, the evaluation results can be rapidly presented without the equipment manufacturer engineer directly going on the site, thereby enabling more effective operation support to be realized.

Further, it is to be noted that the present invention is not limited to the described embodiments and many other changes and modifications may be made without departing from the scopes of the appended claims.

What is claimed is:

1. An operation support system for a power plant, comprising:
    input means for inputting measured data over a communication network;
    data evaluating means for quantitatively evaluating performance degradation of plant components based on measured data input by said input means so as to create operation support data; and
    output means for outputting said operation support data for confirming said operation support data over the communication network;
    wherein said data evaluating means includes thermal inefficiency loss evaluating means for obtaining losses due to thermal inefficiency, and said loss evaluating means obtains maintenance costs at a time of thermal inefficiency in a deteriorated state of values in performance of the plant components.

2. An operation support system for a power plant, comprising:
    input means for inputting measured data over a communication network;
    data evaluating means for quantitatively evaluating performance degradation of plant components based on measured data input by said input means so as to create operation support data; and
    output means for outputting said operation support data for confirming said operation support data over the communication network;
    wherein said data evaluating means includes
        a predicted power cost evaluating means for calculating power costs based on estimated heat balance in the event of changing values in performance of the plant components, component configuration thereof, or piping system configuration thereof, and
        power cost comparing means for comparing predicted power costs calculated by the predicted power cost evaluating means with current power costs of the power plant.

3. An operation support system for a power plant, comprising:
    input means for inputting measured data over a communication network;
    data evaluating means for quantitatively evaluating performance degradation of plant components based on measured data input by said input means so as to create operation support data; and
    output means for outputting said operation support data for confirming said operation support data over the communication network;
    wherein said data evaluating means includes
        predicted power cost evaluating means for calculating amount-of-change of power costs based on estimated heat balance in the event of changing values in performance of the plant components, component configuration thereof, or piping system configuration thereof, and
        profit-and-loss evaluating means for calculating profit-and-loss according to a change based on amount-of-change of power costs and repair costs required for the change.

4. An operation support system for a power plant, comprising:
    input means for inputting measured data over a communication network;
    data evaluating means for quantitatively evaluating performance degradation of plant components based on measured data input by said input means so as to create operation support data; and
    output means for outputting said operation support data for confirming said operation support data over the communication network;
    wherein said data evaluating means includes
        performance values storing means for storing values in performance of the plant components,
        future prediction evaluating means for predicting future values in performance of respective components based on statistical work using past stored values in performance by the storing means, and
        a simulation model for calculating future heat balance using predicted values in performance of the respective components.

5. An operation support system for a power plant including data evaluating means for inputting measured data of the power plant, said data evaluating means comprising:
- a heat balance model for calculating values in performance of respective plant components with heat balance computation based on measured data of the power plant; and
- a simulation model for inputting values in performance of the respective components, said simulation model obtaining process values by using values in performance of the plant components so as to estimate heat balance at the time of changing running conditions.

6. An operation support system for a power plant according to claim 5, wherein said simulation model estimates heat balance in the event of changing values in performance of the plant components, a component configuration thereof, or a piping system configuration thereof.

7. An operation support system for a power plant according to claim 5, wherein said data evaluating means includes a predicted power cost evaluating means for calculating power costs based on estimated heat balance in the event of changing values in performance of the plant components, component configuration thereof, or piping system configuration thereof, and power cost comparing means for comparing predicted power costs calculated by the predicted power cost evaluating means with current power costs of the power plant.

8. An operation support system for a power plant according to claim 5, wherein said data evaluating means comprises predicted power cost evaluating means for calculating amount-of-change of power costs based on estimated heat balance in the event of changing values in performance of the plant components, component configuration thereof, or piping system configuration thereof, and profit-and-loss evaluating means for calculating profit-and-loss according to a change based on amount-of-change of power costs and repair costs required for the change.

9. An operation support system for a power plant according to claim 5, wherein said data evaluating means comprises performance values storing means for storing values in performance of the plant components, future prediction evaluating means for predicting future values in performance of respective components based on statistical work using past stored values in performance by the storing means, and a simulation model for calculating future heat balance using predicted values in performance of the respective components.

10. An operation support system for a power plant according to claim 5, wherein said data evaluating means includes a simulation model for estimating plant thermal efficiency as to calculated parameters representing equipment performance of the plant components, a fluidic state, or power load.

11. An operation support system for a power plant according to claim 5, wherein said data evaluating means is connected to a data collection device of the power plant over a communication network.

12. An operation support system for a power plant according to claim 5, wherein said data evaluating means is connected to a computer for confirming operation support data over a communication network.

* * * * *